(12) United States Patent
Tsuda et al.

(10) Patent No.: US 7,068,876 B1
(45) Date of Patent: Jun. 27, 2006

(54) METHOD AND SYSTEM FOR OPTICAL TRANSMISSION ADOPTING DISPERSION COMPENSATION

(75) Inventors: Takashi Tsuda, Kawasaki (JP); Kazuo Yamane, Kawasaki (JP); Yumiko Kawasaki, Shinagawa-ku (JP); Satoru Okano, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/432,112

(22) Filed: Nov. 2, 1999

(30) Foreign Application Priority Data

Feb. 16, 1999 (JP) ................................. 11-037837

(51) Int. Cl.
*G02B 6/28* (2006.01)
(52) U.S. Cl. .................. 385/24; 385/134; 398/79; 398/136; 398/147; 398/148; 359/337.5
(58) Field of Classification Search ............... 359/161, 359/124, 153, 337.5; 385/24, 134; 398/79, 398/136, 147, 148, 159, 193, 208, 81
See application file for complete search history.

(56) References Cited

U.S. PATENT DOCUMENTS

| 5,218,662 | A | | 6/1993 | Dugan ........................ 359/161 |
|---|---|---|---|---|
| 5,224,183 | A | * | 6/1993 | Dugan ........................ 359/115 |
| 5,559,920 | A | * | 9/1996 | Chraplyvy et al. .......... 359/115 |
| 5,602,666 | A | | 2/1997 | Ishikawa et al. ............ 359/161 |
| 5,608,562 | A | | 3/1997 | Delavaux et al. ........... 359/161 |
| 5,717,510 | A | * | 2/1998 | Ishikawa et al. ............ 359/161 |
| 5,778,128 | A | * | 7/1998 | Wildeman ................... 385/123 |
| 5,831,754 | A | * | 11/1998 | Nakano ........................ 359/161 |
| 5,877,881 | A | | 3/1999 | Miyauchi et al. ........... 359/161 |
| 5,886,804 | A | | 3/1999 | Onaka et al. ................ 359/161 |
| 5,940,208 | A | | 8/1999 | Blaszyk et al. ............... 385/20 |
| 5,956,440 | A | | 9/1999 | Mikami et al. ............... 385/24 |
| 5,966,228 | A | * | 10/1999 | Akiba et al. ................. 359/173 |
| 5,978,122 | A | * | 11/1999 | Kawazawa et al. ........... 398/81 |
| 6,195,480 | B1 | * | 2/2001 | Kosaka et al. ................ 385/24 |
| 6,229,631 | B1 | * | 5/2001 | Sato et al. ..................... 398/30 |
| 6,236,500 | B1 | * | 5/2001 | Suzuki et al. ............... 359/124 |
| 6,266,170 | B1 | * | 7/2001 | Fee ............................. 398/147 |

(Continued)

FOREIGN PATENT DOCUMENTS

GB 2268018 A 12/1993

(Continued)

OTHER PUBLICATIONS

Masahito Tomizawa, et al., "Automatic Dispersion Equalization for Installing High-Speed Optical Transmission Systems", J. Lightwave Techn., Vo. 16, No. 2, pp. 184-191, Feb. 1998.

(Continued)

*Primary Examiner*—Fayez G. Assaf
(74) *Attorney, Agent, or Firm*—Staas & Halsey LLP (57) ABSTRACT

An optical fiber transmission line composed of a plurality of segments each having a length falling within a predetermined range is provided. An optical transmitter for supplying an optical signal to the transmission line is provided at one end of the transmission line. An optical receiver for receiving the optical signal from the transmission line is provided at the other end of the transmission line. An optical amplifier is provided between any two adjacent ones of the segments. A dispersion compensator is provided in association with each of the optical transmitter, the optical receiver, and the optical amplifier. The dispersion compensator provides a dispersion selected from a plurality of stepwise varying dispersions determined according to the predetermined range.

5 Claims, 5 Drawing Sheets

U.S. PATENT DOCUMENTS

| | | | |
|---|---|---|---|
| 6,320,687 B1* | 11/2001 | Ishikawa | 398/147 |
| 6,351,323 B1* | 2/2002 | Onaka et al. | 398/84 |
| RE37,621 E * | 4/2002 | Henmi et al. | 359/179 |
| 6,400,475 B1* | 6/2002 | Kosaka et al. | 359/110 |
| 6,496,300 B1* | 12/2002 | Kinoshita et al. | 359/161 |
| 2001/0003549 A1* | 6/2001 | Abbott et al. | 385/24 |

FOREIGN PATENT DOCUMENTS

| | | |
|---|---|---|
| WO | WO 97/37446 | 10/1997 |

OTHER PUBLICATIONS

J. M. Jacob, et al., "10-GBit/s transoceanic soliton transmission using mostly normal dispersion fiber", OFC '97 Technical Digest, pp. 305-306, Dec. 1997.

T. Matsuda, et al., "4×10 GBit/s RZ-signal transmission over 5040 km in anomalous regime with optimally dispersion-compensated WDM channels", Electron. Lett., vol. 33, No. 18, pp. 1562-1563, Aug. 28, 1997.

K M. Guild, et al., "Unrepeatered transmission over 415 km at 2.5 Gbit/s with Raman gain and +26.5 dBm launch power", Electron. Lett., Vo. 32, No. 22, pp. 2087-2088, Oct. 24, 1996.

Ting-Kuang Chiang, et al., "Cross-Phase Modulation in Fiber Links with Multiple Optical Amplifiers and Dispersion Compensators", J. Lightwave Techn., Vo. 14, No. 3, pp. 249-259, Mar. 1996*

K. Takiguchi, et al., "Dispersion compensation using a variable group-delay dispersion equaliser", Electron. Lett., vol. 31, No. 25, pp. 2192-2194, Dec. 7, 1995.*

H. Taka, et al., "Performance Evaluation of the Different Types of Fiber-Chromatic-Dispersion Equalization for IM-DD Ultralong-Distance Optical Communication Systems with Er-Doped Fiber Amplifiers", J. Lightwave Techn., 12(9), Sep. 1994, pp. 1616-1621.*

Naoya Henmi, et al., "An Arrangement of Transmission-Fiber Dispersions for Increasing the Spacing Between Optical Amplifiers in Lumped Repeater Systems", IEEE Photonics Techn. Letters, vol. 5, No. 11, pp. 1337-1340, Nov. 1993.*

A.H. Gnauck, et al., "160 Gbit/s (8×20 Gbit/s WDM) 300 km transmission with 50 km amplifier spacing and span-by-span dispersion reversal", Electronics Letters, vol. 30, No. 15, pp. 1241-1243, Jul. 21, 1994.*

L.D. Garrett, et al., "Dispersion Management in Optical Networks", ECOC '97, Sep. 22-25, 1997, Conf. Pub. No. 448, pp. 73-76, (c) IEE.*

M.E. Marhic, et al., "Optimizing the Location of Dispersion Compensators in Periodically Amplified Fiber Links in the Presenece of Third-Order Nonlinear Effects", IEE Photonics Tech. Lett., vol. 8, No. 1, pp. 145-147, Jan. 1996.*

M. Newhouse, et al., "System needs for dispersion compensation", 1997 Conf. on Optical Fiber Comm. (OFC '97) Technical Digest, p. 233 (ThA1), Feb. 1997.*

Itsuro Morita, et al., "Single-Channel 40 Gbit/s, 5000km Straight-line Soliton Transmission Experiment Using Periodic Dispersion Compensation", 22 European Conf. on Optical Comm., ECOC '96, vol. 2, pp. 191-194 (TuD3.1), Sep. 1996.*

Akihide Sano, et al., " Automatic dispersion equalization by monitoring extracted-clock power lever in a 40-Gbit/s, 200 km transmission line", 22nd European Conf. on Optical Comm., ECOC '96 (TuD.3.5), vol. 2, pp. 207-210, Sep. 1996.*

Alain Bertaina, et al., "Investigation of the limitations of WDM typical terrestrial transmissions over NZDSF and SMF", 24th European Conf. on Optical Comm. (ECOC '98), pp. 279-280, Sep. 1998.*

Hidenori Taga, et al., "Long-Distance WDM Transmission Experiments Using the Dispersion Slope Compensator", IEEE J. of Quantum Electronics, vol. 34, No. 11, pp. 2055-2063, Nov. 1998.*

F. Neddam, et al., "Performance enhancement of WDM dispersion-managed RZ systems by optical in-line regeneration", 24th European Conf. on Optical Comm., ECOC '98, pp. 305-306, Sep. 1998.*

N.S. Bergano, et al., "Wavelength Division Multiplexing in Lang-Haul Transmission Systems", IEEE J. Lightwave Technology, vol. 14, No. 6, pp. 1299-1308, Jun. 1996.*

* cited by examiner

METHOD AND SYSTEM FOR OPTICAL TRANSMISSION ADOPTING DISPERSION COMPENSATION

BACKGROUND OF THE INVENTION

1. Field of the Invention

The present invention relates to a method and system for optical transmission adopting dispersion compensation.

2. Description of the Related Art

Owing to recent developments of low-loss silica optical fibers, various optical fiber communication systems each using such an optical fiber as a transmission line have been put to practical use. The optical fiber itself has a very wide band. However, a transmission capacity by the optical fiber is actually limited by a system design. The most important limitation is due to waveform distortion by chromatic dispersion occurring in the optical fiber. Further, the optical fiber attenuates an optical signal at a rate of about 0.2 dB/km, for example. Loss of the optical signal due to this attenuation has been compensated for by adopting an optical amplifier such as an erbium doped fiber amplifier (EDFA) that is a typical example. The EDFA has a gain band in a 1.55 μm band where a silica optical fiber gives a lowest loss.

The chromatic dispersion that is often referred to simply as dispersion is a phenomenon such that the group velocity of an optical signal in an optical fiber changes as a function of the wavelength (or frequency) of the optical signal. In a standard single-mode fiber, for example, an optical signal having a longer wavelength propagates faster than an optical signal having a shorter wavelength in a wavelength region shorter than 1.3 μm, and the resultant dispersion is usually referred to as normal dispersion. In this case, the dispersion (whose unit is ps/nm/km) takes on a negative value. In contrast, an optical signal having a shorter wavelength propagates faster than an optical signal having a longer wavelength in a wavelength region longer than 1.3 μm, and the resultant dispersion is usually referred to as anomalous dispersion. In this case, the dispersion takes on a positive value.

In recent years, the nonlinearities of an optical fiber have received attention in association with an increase in optical signal power due to the use of an EDFA. The most important nonlinearity that limits a transmission capacity is an optical Kerr effect occurring in an optical fiber. The optical Kerr effect is a phenomenon such that the refractive index of an optical fiber changes with the power or intensity of an optical signal. A change in the refractive index modulates the phase of an optical signal propagating in an optical fiber, resulting in the occurrence of frequency (wavelength) shift near the leading edge and the trailing edge of an optical waveform. This phenomenon is known as self-phase modulation (SPM). There is a possibility that such a change in spectrum due to SPM may further enlarge the waveform distortion due to chromatic dispersion.

In this manner, the chromatic dispersion and the optical Kerr effect impart waveform distortion to an optical signal with an increase in transmission distance. Accordingly, to allow long-haul transmission by an optical fiber while ensuring a transmission quality, the chromatic dispersion and the nonlinearity must be controlled, compensated, or suppressed.

As a method for compensating for dispersion in an optical fiber transmission system, a method using a dispersion compensator is known. For example, the dispersion compensator is configured so as to include a dispersion compensating fiber (DCF) having such a dispersion as canceling the dispersion of an optical fiber transmission line.

Known as a form of the optical fiber transmission system is a linear repeater system configured by connecting a plurality of segments each formed from an optical fiber and providing an optical amplifier at each connection point of these segments. This kind of system usually includes a plurality of dispersion compensators, and each dispersion compensator is provided in association with an optical transmitter, each optical amplifier, or an optical receiver. Each dispersion compensator is designed so that the total dispersion over the optical fiber transmission line is made to fall within tolerance by the addition of a dispersion given by each dispersion compensator. Accordingly, if there are variations in length of the optical fiber forming each segment, each dispersion compensator cannot be easily designed.

In another respect, the optical fiber to be used as the optical fiber transmission line is of various kinds such as a single-mode fiber (SMF) having a zero-dispersion wavelength of about 1.3 μm and a dispersion shifted fiber (DSF) having a zero-dispersion wavelength of about 1.55 μm. The SMF has a low loss in a wavelength band of 1.55 μm, but has a relatively large dispersion (e.g., 18 ps/nm/km) in this wavelength band. The SMF is widely installed at present, and can also support WDM (wavelength division multiplexing) transmission. On the other hand, the DSF is a fiber having a zero-dispersion wavelength shifted into a 1.55-μm band that is a low-loss wavelength band, and the amount of installation of the DSF is yet small at present. Further, the DSF is susceptible to nonlinearity in WDM transmission. To reduce the susceptibility to nonlinearity, an NZ (nonzero)-DSF having slight dispersion in the 1.55-μm band has also been developed.

Also in such a case that a plurality of segments formed from various kinds of optical fibers are mixed, the placement of dispersion compensators and the distribution of dispersion compensation amounts are important in system design, and each dispersion compensator cannot be easily designed.

SUMMARY OF THE INVENTION

It is therefore an object of the present invention to provide a method and system for optical transmission in which dispersion compensators can be easily designed.

In accordance with a first aspect of the present invention, there is provided a method for optical transmission adopting dispersion compensation, comprising the steps of (a) providing an optical fiber transmission line composed of a plurality of segments each having a length falling within a predetermined range; (b) providing an optical transmitter for supplying an optical signal to the optical fiber transmission line at one end of the optical fiber transmission line; (c) providing an optical receiver for receiving the optical signal from the optical fiber transmission line at the other end of the optical fiber transmission line; (d) providing an optical amplifier between any two adjacent ones of the segments; and (e) providing a dispersion compensator in association with each of the optical transmitter, the optical receiver, and the optical amplifier; the dispersion compensator providing a dispersion selected from a plurality of stepwise varying dispersions determined according to the predetermined range.

According to this method, each dispersion compensator can be configured so as to have a dispersion selected from a plurality of stepwise varying dispersions determined according to the predetermined range. For example, by preparing several kinds of dispersion compensators providing different dispersions and suitably applying to each segment the dispersion compensator selected according to the length of the segment, the total dispersion over the optical fiber transmission line can be easily made to fall within tolerance, thereby easily designing each dispersion compensator. Thus, the object of the present invention can be achieved.

In accordance with a second aspect of the present invention, there is provided a method for optical transmission adopting dispersion compensation, comprising the steps of (a) providing an optical fiber transmission line including at least one first segment formed from a single-mode fiber and at least one second segment formed from a dispersion shifted fiber; (b) providing an optical transmitter for supplying an optical signal to the optical fiber transmission line at one end of the optical fiber transmission line; (c) providing an optical receiver for receiving the optical signal from the optical fiber transmission line at the other end of the optical fiber transmission line; (d) providing an optical amplifier between any two adjacent ones of the segments; and (e) providing a dispersion compensator in association with each of the optical transmitter, the optical receiver, and the optical amplifier except that corresponding to at least one end of the second segment.

In accordance with a third aspect of the present invention, there is provided a system for optical transmission adopting dispersion compensation, comprising an optical fiber transmission line composed of a plurality of segments each having a length falling within a predetermined range; an optical transmitter for supplying an optical signal to the optical fiber transmission line from one end thereof; an optical receiver for receiving the optical signal from the other end of the optical fiber transmission line; an optical amplifier provided between any two adjacent ones of the segments; and a dispersion compensator provided in association with each of the optical transmitter, the optical receiver, and the optical amplifier; the dispersion compensator providing a dispersion selected from a plurality of stepwise varying dispersions determined according to the predetermined range.

In accordance with a fourth aspect of the present invention, there is provided a system for optical transmission adopting dispersion compensation, comprising an optical fiber transmission line including at least one first segment formed from a single-mode fiber and at least one second segment formed from a dispersion shifted fiber; an optical transmitter for supplying an optical signal to the optical fiber transmission line from one end thereof; an optical receiver for receiving the optical signal from the other end of the optical fiber transmission line; an optical amplifier provided between any two adjacent ones of the segments; and a dispersion compensator provided in association with each of the optical transmitter, the optical receiver and the optical amplifier except that corresponding to at least one end of the second segment.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
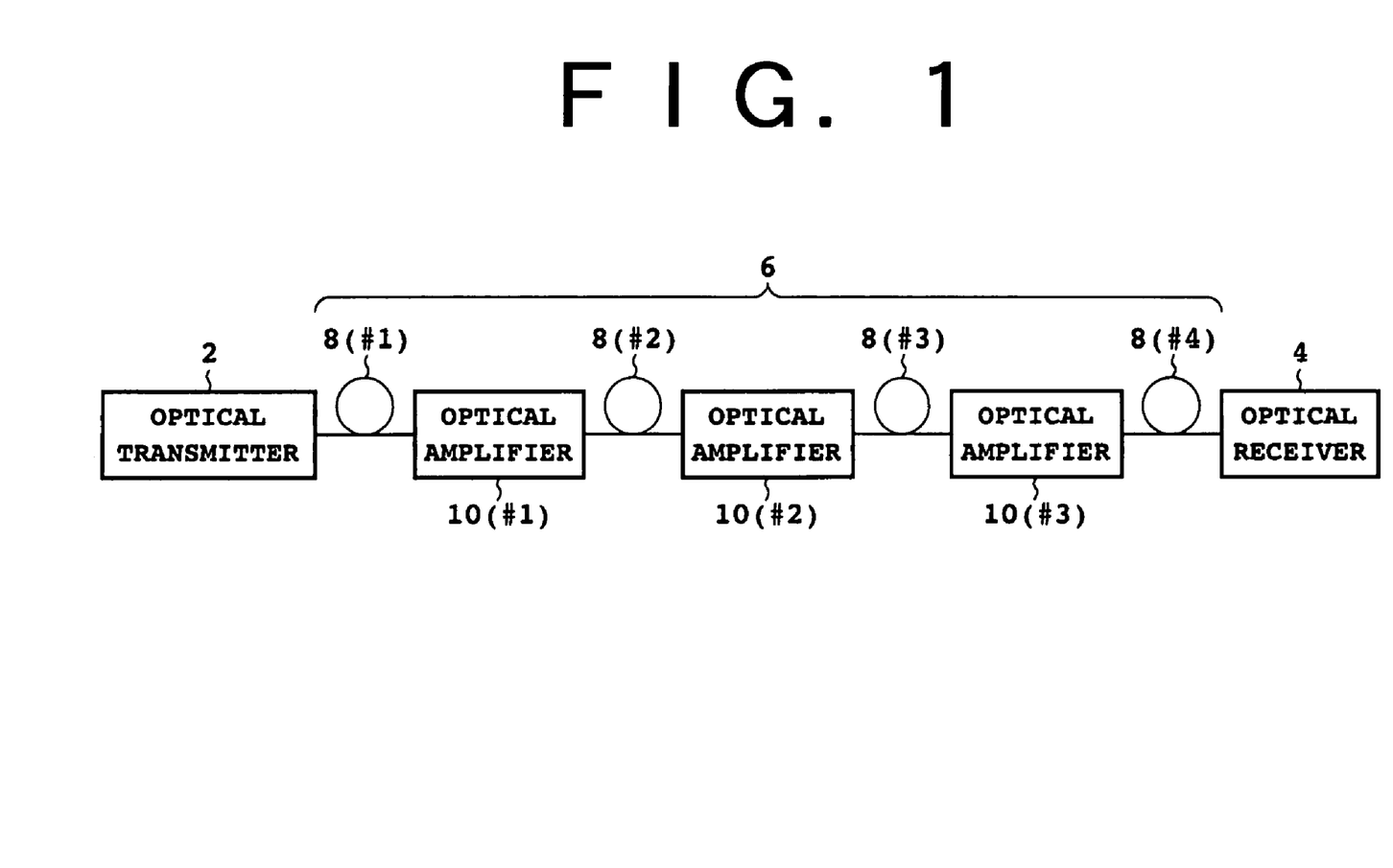
FIG. 1 is a block diagram showing a preferred embodiment of the system for optical transmission according to the present invention.

FIG. 1 is a block diagram showing a preferred embodiment of the system for optical transmission according to the present invention. This system has an optical transmitter 2, an optical receiver 4, and an optical fiber transmission line (optical fiber span) 6 connecting the optical transmitter 2 and the optical receiver 4. The optical fiber transmission line 6 is composed of a plurality of (e.g., four as shown) segments 8(#1) to 8(#4) each having a length falling within a predetermined range. An optical amplifier for compensating for the loss of an optical signal is provided between any two adjacent ones of the segments 8(#1) to 8(#4). More specifically, an optical amplifier 10(#1) is provided between the segments 8(#1) and 8(#2); an optical amplifier 10(#2) is provided between the segments 8(#2) and 8(#3); and an optical amplifier 10(#3) is provided between the segments 8(#3) and 8(#4).

In the case of one-channel transmission not adopting WDM (wavelength division multiplexing), the optical transmitter 2 launches an optical signal of one channel into the optical fiber transmission line 6, whereas in the case of adopting WDM, the optical transmitter 2 launches WDM signal light obtained by wavelength division multiplexing a plurality of optical signals having different wavelengths into the optical fiber transmission line 6. The optical receiver 4 receives the optical signal or the WDM signal light from the optical fiber transmission line 6.

Figure 2A:
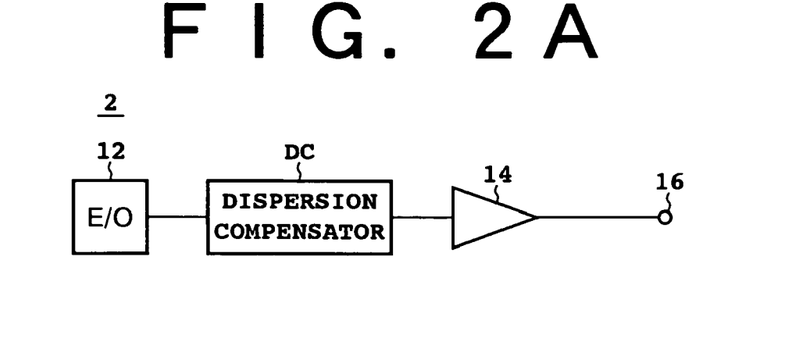
FIGS. 2A, 2B, and 2C are block diagrams showing preferred embodiments of an optical transmitter, an optical amplifier, and an optical receiver in one-channel transmission, respectively.
Figure 2B:
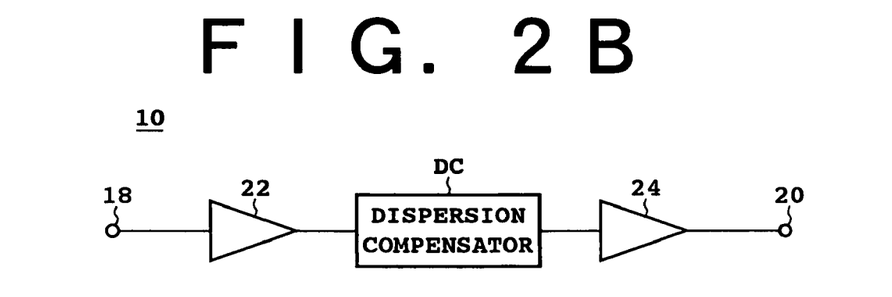
Figure 2C:
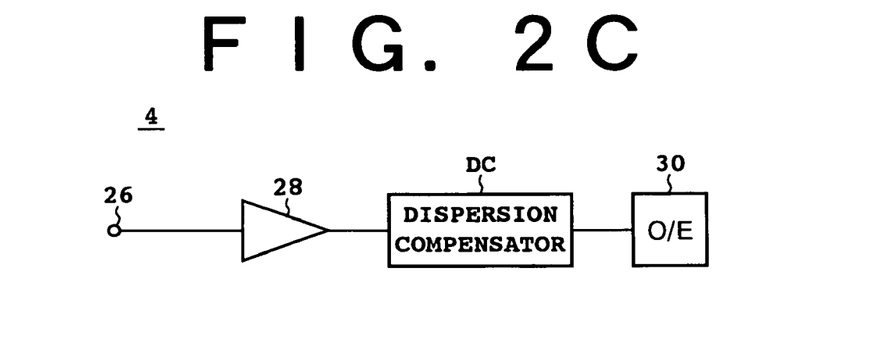

FIGS. 2A, 2B, and 2C are block diagrams showing preferred embodiments of the optical transmitter 2, each optical amplifier 10 (each of the optical amplifiers 10(#1), 10(#2), and 10(#3)), and the optical receiver 4 in one-channel transmission, respectively. As shown in FIG. 2A, the optical transmitter 2 includes an E/O (electro/optic) converter 12 for converting an electrical signal corresponding to transmission data into an optical signal, and a postamplifier 14 for amplifying the optical signal. The optical signal amplified by the postamplifier 14 is launched from an output port 16 into the first segment 8(#1) of the optical fiber transmission line 6. A dispersion compensator DC is provided between the E/O converter 12 and the postamplifier 14.

As shown in FIG. 2B, the optical amplifier 10 includes a front-stage amplifier 22 and a rear-stage amplifier 24 cascaded between an input port 18 and an output port 20. A dispersion compensator DC is provided between the front-stage amplifier 22 and the rear-stage amplifier 24.

As shown in FIG. 2C, the optical receiver 4 includes a preamplifier 28 for amplifying an optical signal from an input port 26 connected to the fourth segment 8(#4) of the optical fiber transmission line 6, and an O/E (opto/electric) converter 30 for converting the amplified optical signal into an electrical signal. A dispersion compensator DC is provided between the preamplifier 28 and the O/E converter 30. Each dispersion compensator DC provides a dispersion selected from a plurality of stepwise varying dispersions determined according to the predetermined range of length of each of the segments 8(#1) to 8(#4). Examples of this setting of the dispersion will be hereinafter described.

Figure 3A:
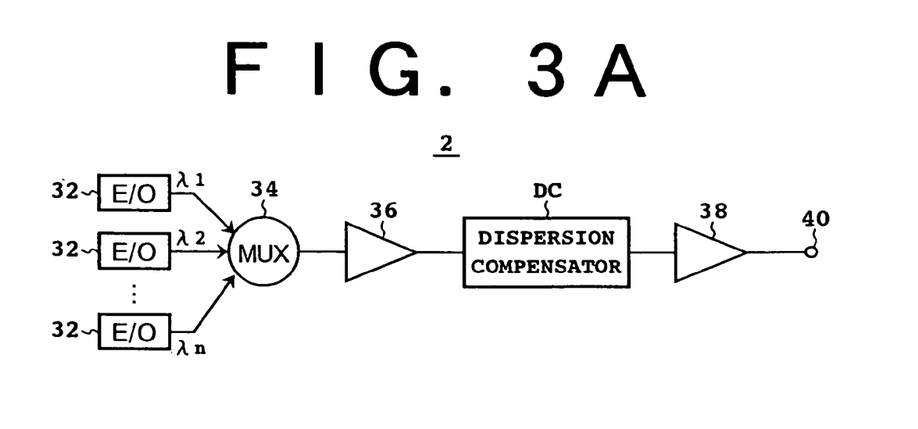
FIGS. 3A, 3B, and 3C are block diagrams showing preferred embodiments of the optical transmitter, the optical amplifier, and the optical receiver in WDM (wavelength division multiplexing) transmission.
Figure 3B:
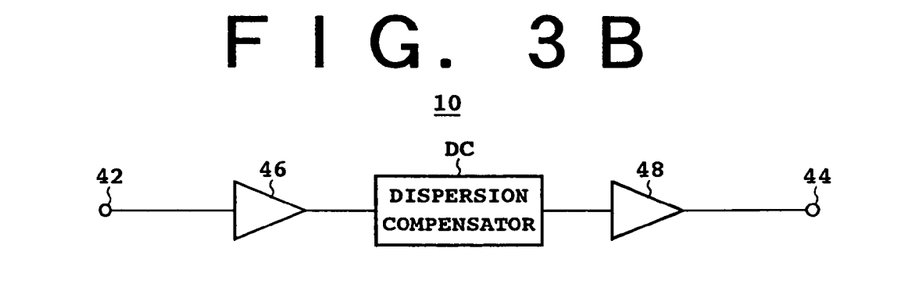
Figure 3C:
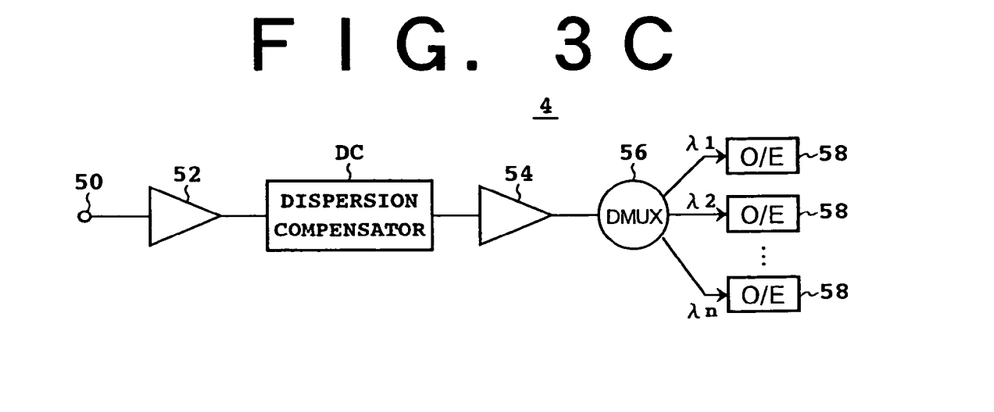

FIGS. 3A, 3B, and 3C are block diagrams showing preferred embodiments of the optical transmitter 2, each optical amplifier 10, and the optical receiver 4 in WDM transmission. As shown in FIG. 3A, the optical transmitter 2 includes a plurality of E/O converters 32 for outputting a plurality of optical signals having different wavelengths λ1 to λn, an optical multiplexer (MUX) 34 for wavelength division multiplexing these optical signals to output resultant WDM signal light, and a front-stage amplifier 36 and a rear-stage amplifier 38 cascaded with each other to amplify the WDM signal light. The WDM signal light is launched from an output port 40 into the first segment 8(#1) of the optical fiber transmission line 6. A dispersion compensator DC is provided between the front-stage amplifier 36 and the rear-stage amplifier 38. Each E/O converter 32 functions to convert an electrical signal corresponding to transmission data into an optical signal. The plural E/O converters 32 are respectively connected to a plurality of input ports of the optical multiplexer 34. A single output port of the optical multiplexer 34 is connected to the front-stage amplifier 36.

As shown in FIG. 3B, the optical amplifier 10 includes a front-stage amplifier 46 and a rear-stage amplifier 48 cascaded between an input port 42 and an output port 44. A dispersion compensator DC is provided between the front-stage amplifier 46 and the rear-stage amplifier 48.

As shown in FIG. 3C, the optical receiver 4 includes a front-stage amplifier 52 and a rear-stage amplifier 54 cascaded with each other to amplify WDM signal light from an input port 50 connected to the fourth segment 8(#4) of the optical fiber transmission line 6, an optical demultiplexer (DMUX) 56 for separating the amplified WDM signal light into a plurality of optical signals having different wavelengths λ1 to λn, and a plurality of O/E converters 58 for respectively converting these optical signals into electrical signals. A dispersion compensator DC is provided between the front-stage amplifier 52 and the rear-stage amplifier 54. A single input port of the optical demultiplexer 56 is connected to the rear-stage amplifier 54, and a plurality of output ports of the optical demultiplexer 56 are respectively connected to the plural O/E converters 58. In each of the one-channel transmission and the WDM transmission mentioned above, front-stage amplifiers and rear-stage amplifiers are combined as required. In this case, by using a relatively low-noise amplifier as each front-stage amplifier and a relatively high-output amplifier as each rear-stage amplifier, a reduction in noise figure due to loss by each dispersion compensator can be prevented and a required high output can also be obtained. Further, in each of the optical transmitter and the optical receiver for WDM transmission, the combination of the front-stage amplifier and the rear-stage amplifier is intended to easily make flat the wavelength characteristic of gain.

Figure 4:
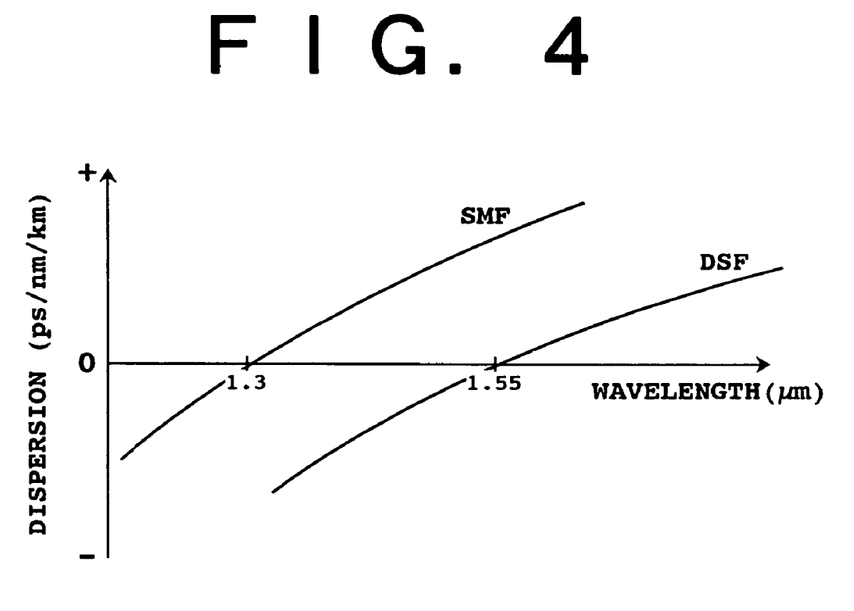
FIG. 4 is a graph showing dispersion characteristics of optical fibers applicable to the present invention.

FIG. 4 is a graph showing dispersion characteristics of optical fibers usable as each segment 8. In FIG. 4, the vertical axis represents dispersion (ps/nm/km) and the horizontal axis represents wavelength (μm). In the case that a general silica-based single-mode fiber (SMF) is used as each segment 8, the zero-dispersion wavelength of the SMF is about 1.3 μm. In this case, the dispersion falls in a region of anomalous dispersion for an optical signal having a wavelength longer than the zero-dispersion wavelength, and has a positive value. Conversely, the dispersion falls in a region of normal dispersion for an optical signal having a wavelength shorter than the zero-dispersion wavelength, and has a negative value.

In the case of using an SMF as each segment 8, the wavelength of an optical signal is set to fall in a 1.55 μm band (e.g., 1.50 to 1.60 μm) giving a minimum loss in the SMF, so as to minimize the loss and maximize the length of each segment 8. Accordingly, the dispersion for the optical signal falls always in a region of anomalous dispersion. Accordingly, in the case that all the segments 8 are provided by SMFs, it is desirable to perform dispersion compensation in each segment 8. An example of setting on distribution or the like of dispersion compensation amounts in this case will be hereinafter described.

In the case that a dispersion shifted fiber (DSF) is used as each segment 8, the zero-dispersion wavelength of the DSF is about 1.55 μm. Also in this case, the dispersion falls in a region of anomalous dispersion for an optical signal having a wavelength longer than the zero-dispersion wavelength, and has a positive value. Conversely, the dispersion falls in a region of normal dispersion for an optical signal having a wavelength shorter than the zero-dispersion wavelength, and has a negative value.

Because the wavelength giving a minimum loss in the DSF is also equal to about 1.55 μm, the wavelength of an optical signal is set to fall in a 1.55 μm band. Accordingly, whether the dispersion in the DSF falls in a region of anomalous dispersion or in a region of normal dispersion is determined according to the correlation between the actual wavelength of an optical signal and the zero-dispersion wavelength of the DSF. However, as far as the wavelength of an optical signal is set in a 1.55-μm band, the dispersion (ps/nm) in the segment is sufficiently small irrespective of whether the dispersion in the DSF falls in an anomalous dispersion region or in a normal dispersion region, so that no dispersion compensation may be required in the segment formed from a DSF. In other words, in the case that at least one segment formed from a DSF and at least one segment formed from an SMF are mixed, there is a possibility that the application of a dispersion compensator to the segment formed of a DSF may be omitted. An example of such a configuration will also be hereinafter described.

TABLE 1

| Segment Distance (km) | Dispersion Compensation Amount (ps/nm) | | |
|---|---|---|---|
| | Optical Transmitter | Optical Amplifier | Optical Receiver |
| 0–20 | −600 | −200 | −200 |
| 20–40 | | −400 | |
| 40–60 | | −700 | −600 |
| 60–80 | | −1000 | |

Table 1 shows an example of setting of the dispersion compensation amount of each dispersion compensator DC in the case that all the segments 8(#1) to 8(#4) shown in FIG. 1 are SMFs. In this example, the dispersion (ps/nm; ditto for the following) of the dispersion compensation DC in the optical transmitter 2 is set to −600. The dispersions of the dispersion compensators DC in the optical amplifiers 10(#1) to 10(#3) and in the optical receiver 4 are set according to the distance (km; ditto for the following) of the corresponding segment 8 immediately upstream of each optical component. For example, the dispersion of the dispersion compensator DC in the optical amplifier 10(#1) is set in such a manner that when the distance of the segment 8(#1) is less than 20, the dispersion is set to −200; when the distance of the segment 8(#1) is in the range from 20 to less than 40, the dispersion is set to −400; when the distance of the segment 8(#1) is in the range from 40 to less than 60, the dispersion is set to −700; and when the distance of the segment 8(#1) is in the range from 60 to less than 80, the dispersion is set to −1000. Similarly, the dispersion of the dispersion compensator DC in the optical amplifier 10(#2) is set according to the distance of the segment 8(#2), and the dispersion of the dispersion compensator DC in the optical amplifier 10(#3) is set according to the distance of the segment 8(#3). Further, the dispersion of the dispersion compensator DC in the optical receiver 4 is set in such a manner that when the distance of the segment 8(#4) is less than 40, the dispersion is set to −200, and when the distance of the segment 8(#4) is in the range from 40 to less than 80, the dispersion is set to −600.

According to this preferred embodiment, the total dispersion over the optical fiber transmission line 6 can be easily made to fall within tolerance, so that the waveform distortion due to dispersion can be suppressed to thereby improve a transmission quality. Further, since the distance of each segment is set within a predetermined range (0–80 in this example), a transmission line loss can be easily compensated by each optical amplifier 10. Further, since it is not necessary to increase the output power of each optical amplifier 10 to a given value or more, the waveform distortion due to nonlinearity can be suppressed to thereby improve a transmission quality. Further, since each dispersion compensator DC provides a dispersion selected from a plurality of stepwise varying dispersions determined according to a predetermined distance range (0–20, 20–40, 40–60, or 60–80), each dispersion compensator DC can be selected from a given menu. That is, several kinds of dispersion compensators having different dispersions may be prepared in advance and they may be selectively used according to the distance of each segment 8, thereby allowing easy construction of a system. Thus, it is possible to provide a method and system for optical transmission in which dispersion compensators can be easily designed.

There will now be described an example of setting of the dispersion compensation amount of each dispersion compensator DC in the case that a DSF is applied to at least one of the segments 8(#1) to 8(#4).

TABLE 2

| DSF Applied Segment | Dispersion Compensation Amount (ps/nm) | | | | |
|---|---|---|---|---|---|
| | Optical Transmitter | Optical Amplifiers | | | Optical Receiver |
| | | #1 | #2 | #3 | |
| First Segment | 0 | −600 | −1000 | −1000 | −600 |
| Second Segment | −600 | −800 | 0 | | −800 |
| Third Segment | −1000 | | −800 | 0 | |
| Fourth Segment | | | −1000 | −600 | 0 |

Table 2 shows an example of setting of the dispersion compensation amount of each dispersion compensator DC in the case that a DSF is applied to one of the segments 8(#1) to 8(#4) shown in FIG. 1 and SMFs are applied to the other segments. In the case that a DSF is applied to the first segment 8(#1), the dispersion compensator DC in the optical transmitter 2 is omitted, the dispersion of the dispersion compensator DC in the optical amplifier 10(#1) is set to −600, the dispersion of the dispersion compensator DC in the optical amplifier 10(#2) is set to −1000, the dispersion of the dispersion compensator DC in the optical amplifier 10(#3) is set to −1000, and the dispersion of the dispersion compensator DC in the optical receiver 4 is set to −600.

In the case that a DSF is applied to any one of the second segment 8(#2), the third segment 8(#3), and the fourth segment 8(#4), the dispersion of the dispersion compensator DC in the optical transmitter 2 is set to −600. In the case that a DSF is applied to the second segment 8(#2), the dispersion of the dispersion compensator DC in the optical amplifier 10(#1) is set to −800, the dispersion compensator DC in the optical amplifier 10(#2) is omitted, the dispersion of the dispersion compensator DC in the optical amplifier 10(#3) is set to −1000, and the dispersion of the dispersion compensator DC in the optical receiver 4 is set to −800. In the case that a DSF is applied to the third segment 8(#3), the dispersion of the dispersion compensator DC in the optical amplifier 10(#1) is set to −1000, the dispersion of the dispersion compensator DC in the optical amplifier 10(#2) is set to −800, the dispersion compensator DC in the optical amplifier 10(#3) is omitted, and the dispersion of the dispersion compensator DC in the optical receiver 4 is set to −800. In the case that a DSF is applied to the fourth segment 8(#4), the dispersion of the dispersion compensator DC in the optical amplifier 10(#1) is set to −1000, the dispersion of the dispersion compensator DC in the optical amplifier 10(#2) is set to −1000, the dispersion of the dispersion compensator DC in the optical amplifier 10(#3) is set to −600, and the dispersion compensator DC in the optical receiver 4 is omitted.

The distance of each segment is set to 70, for example. Preferably, the distance of each segment is set within a predetermined range (0–80) as in the case that SMFs only are applied.

According to this preferred embodiment, a DSF is applied to any one of the segments 8(#1) to 8(#4), so that the dispersion compensator DC corresponding to one end of the segment to which the DSF is applied can be omitted. Accordingly, although a reduced number of dispersion compensators are used, the total dispersion over the optical fiber transmission line 6 can be easily made to fall within tolerance, so that the waveform distortion due to dispersion can be suppressed to thereby improve a transmission quality. Further, like the previous preferred embodiment, each dispersion compensator DC can be selected from a given menu, so that it is possible to provide a method and system for optical transmission in which dispersion compensators can be easily designed.

While a DSF is applied to only one segment in the above description related to Table 2, a plurality of DSFs may be applied to two or more segments.

Thus, by applying a DSF to at least one of the segments 8(#1) to 8(#4), the dispersion compensator DC corresponding to at least one end of each segment to which the DSF is applied can be omitted.

Figure 5:
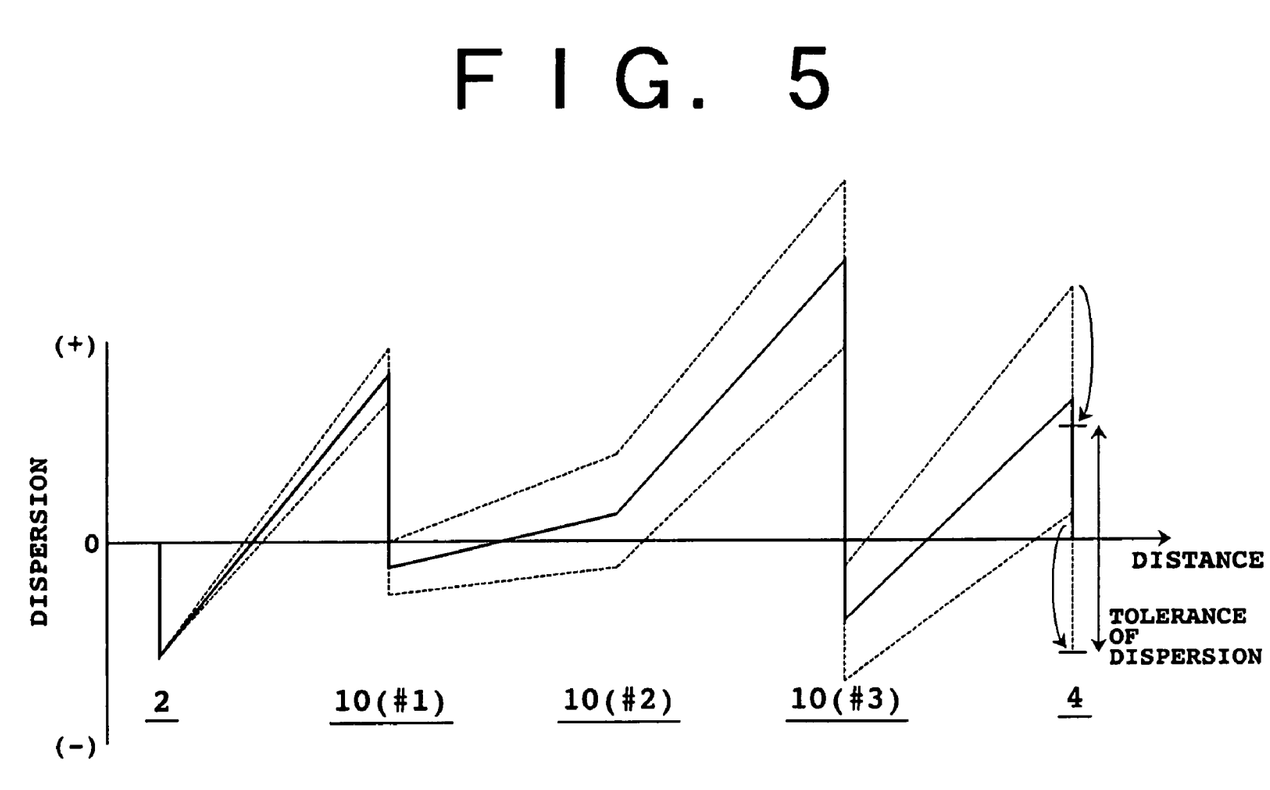
FIG. 5 is a diagram showing an example of a dispersion map obtained by the present invention.

FIG. 5 is a diagram showing an example of a dispersion map obtained by the present invention. In FIG. 5, the vertical axis represents dispersion, and the horizontal axis represents position or distance on the optical fiber transmission line 6. Specifically, FIG. 5 shows a dispersion map in the case that a DSF is applied to the second segment 8(#2) in relation to Table 2. Although the dispersion compensator DC in the optical amplifier 10(#2) is omitted in this case as described above, it is understood from FIG. 5 that the total dispersion over the optical fiber transmission line 6 is made to fall within tolerance by the application of the present invention.

According to the present invention as described above, it is possible to provide a method and system for optical transmission in which dispersion compensators can be easily designed. The effects obtained by the specific preferred embodiments of the present invention have been described, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method for optical transmission adopting dispersion compensation, comprising:
   (a) providing an optical fiber transmission line composed of a plurality of segments each having a length falling within a predetermined range, said plurality of segments including a plurality of fiber types, and an optical fiber having a specific one of the optical fiber types being applied to at least one of said plurality of segments;
   (b) providing an optical transmitter for supplying an optical signal to said optical fiber transmission line at one end of said optical fiber transmission line;
   (c) providing an optical receiver for receiving said optical signal from said optical fiber transmission line at the other end of said optical fiber transmission line;
   (d) providing an optical amplifier between any two adjacent ones of said segments;
   (e) determining where said specific one of the optical fiber types exists in the optical transmission line;
   (f) providing a dispersion compensator responsive to said determination, in each of said optical transmitter, said optical receiver, and said optical amplifier at least according to whether an optical fiber type of an optical fiber transmission line segment immediately downstream of said optical transmitter is said specific one of the optical fiber types or not and a dispersion value of said optical fiber transmission line segment immediately downstream of said transmitter, at least according to whether an optical fiber type of an optical fiber transmission line segment immediately upstream of said optical receiver is said specific one of the optical fiber types or not and a dispersion value of said optical fiber transmission line segment immediately upstream of said optical receiver, and at least according to whether an optical fiber type of an optical fiber transmission line segment immediately upstream of said optical amplifier is said specific one of the optical fiber types or not and dispersion values of optical fiber transmission line segments immediately upstream and downstream of said optical amplifier; and
   (g) omitting a dispersion compensator in at least one of said optical transmitter, said optical receiver and said optical amplifier which locates immediately upstream or downstream of an optical fiber transmission segment whose optical fiber type is said specific one of the optical fiber types; wherein,
   a dispersion compensator provided in said optical amplifier provides a dispersion selected from a plurality of stepwise varying dispersions determined according to said predetermined range.

2. A method according to claim 1, wherein said fiber types of said optical fiber transmission line include a single-mode fiber type having a zero-dispersion wavelength of about 1.3 µm and a dispersion shifted fiber type having a zero-dispersion wavelength of about 1.55 µm.

3. A method according to claim 2, further comprising:
providing a plurality of optical amplifiers, wherein,
said dispersion compensator is not provided in said optical transmitter in a case wherean optical fiber type of an optical fiber transmission line segment immediately downstream of said optical transmitter is said specific one of the optical fiber types and is said dispersion shifted fiber type;
a dispersion of a dispersion compensator provided in one of said plurality of optical amplifiers is determined according to dispersion values of optical fiber transmission line segments immediately upstream and downstream of the optical amplifier; and
an optical fiber type of an optical fiber transmission line segment immediately upstream of the optical amplifier is said dispersion shifted fiber type and an optical fiber type of an optical fiber transmission line segment immediately downstream of the optical amplifier is said single-mode fiber type.

4. A method according to claim 2, further comprising:
providing a plurality of optical amplifiers, wherein, said dispersion compensator is not provided in said optical receiver in a case where an optical fiber type of an optical fiber transmission line segment immediately upstream of said optical receiver is said specific one of the optical fiber types and is said dispersion shifted fiber type;
a dispersion of a dispersion compensator provided in one of said plurality of optical amplifiers is determined according to dispersion values of optical fiber transmission line segments immediately upstream and downstream of the optical amplifier; and
an optical fiber type of an optical fiber transmission line segment immediately upstream of the optical amplifier is said single-mode fiber type and an optical fiber type of an optical fiber transmission line segment immediately downstream of the optical amplifier is said dispersion shifted fiber type.

5. A method according to claim 2, further comprising:
providing a plurality of optical amplifiers, wherein,
a dispersion compensator is omitted in a first optical amplifier in a case where an optical fiber type of an optical fiber transmission line segment immediately upstream of the first optical amplifier is said specific one of the optical fiber types and is said dispersion shifted fiber type;
a dispersion of a dispersion compensator provided in a second optical amplifier is determined according to dispersion values of optical fiber transmission line segments immediately upstream and downstream of the second optical amplifier; and
an optical fiber type of an optical fiber transmission line segment immediately upstream of the second optical amplifier is said single-mode fiber type and an optical fiber type of an optical fiber transmission line segment immediately downstream of the second optical amplifier is said dispersion shifted fiber type.

* * * * *